(12) United States Patent
Hashimoto et al.

(10) Patent No.: US 9,231,498 B2
(45) Date of Patent: Jan. 5, 2016

(54) GEL ACTUATOR AND GEL USED THEREIN

(75) Inventors: Minoru Hashimoto, Ueda (JP);
Yasuhiro Maeda, Ueda (JP)

(73) Assignee: SHINSHU UNIVERSITY, Matsumoto (JP)

( * ) Notice: Subject to any disclaimer, the term of this patent is extended or adjusted under 35 U.S.C. 154(b) by 254 days.

(21) Appl. No.: 13/982,356

(22) PCT Filed: Oct. 28, 2011

(86) PCT No.: PCT/JP2011/074929
§ 371 (c)(1),
(2), (4) Date: Jul. 29, 2013

(87) PCT Pub. No.: WO2012/105095
PCT Pub. Date: Aug. 9, 2012

(65) Prior Publication Data
US 2013/0307374 A1    Nov. 21, 2013

(30) Foreign Application Priority Data
Feb. 3, 2011    (JP) .................................. 2011-021344

(51) Int. Cl.
*H02N 11/00*    (2006.01)
*F03G 7/00*    (2006.01)
(52) U.S. Cl.
CPC .............. *H02N 11/006* (2013.01); *F03G 7/005* (2013.01)

(58) Field of Classification Search
CPC .............................. F03G 7/005; H02N 11/006
USPC ......... 310/309, 308, 300, 800, 365, 366, 367, 310/369, 311, 328, 319, 368
IPC .............................................. H02N 11/00, 2/00
See application file for complete search history.

(56) References Cited

U.S. PATENT DOCUMENTS

| 5,250,167 A * | 10/1993 | Adolf et al. .................... 310/309 |
| 2009/0303613 A1* | 12/2009 | Kinoshita et al. ............. 359/694 |
| 2015/0171305 A1* | 6/2015 | Hashimoto .................... 310/365 |

FOREIGN PATENT DOCUMENTS

| JP | A-02-041685 | 2/1990 |
| JP | A-05-025316 | 2/1993 |
| JP | A-2000-101159 | 4/2000 |
| JP | A-2003-282982 | 10/2003 |

(Continued)

OTHER PUBLICATIONS

Yamano et al., "Structure and Characteristics of a Contraction Type PVC Gel Actuator," *Journal of the Robotics Society of Japan*, Sep. 2009, pp. 718-724, vol. 27, No. 7, Japan (with English Abstract).

(Continued)

*Primary Examiner* — Thomas M Dougherty
*Assistant Examiner* — Karen B Addison
(74) *Attorney, Agent, or Firm* — Oliff PLC

(57) ABSTRACT

A gel actuator includes: a gel having a projected part made of an inductive high-polymer material; a positive electrode disposed so as to be in contact with a top of the projected part; and a negative electrode disposed in a position sandwiching the projected part in a height direction in cooperation with the positive electrode. When voltage is applied between the positive and negative electrodes, creep deformation occurs so that the projected parts adhere to the positive electrode side, and the gel contracts in the thickness direction.

14 Claims, 7 Drawing Sheets

(56) References Cited

FOREIGN PATENT DOCUMENTS

| | | |
|---|---|---|
| JP | A-2009-273204 | 11/2009 |
| JP | A-2010-074900 | 4/2010 |

OTHER PUBLICATIONS

International Search Report issued in International Application No. PCT/JP2011/074929 dated Nov. 22, 2011.

* cited by examiner

GEL ACTUATOR AND GEL USED THEREIN

BACKGROUND

1. Technical Field

The present invention relates to a gel actuator and a gel used for the same.

2. Related Art

Since a gel made of polyvinyl chloride (PVC) has an action that it is deformed when an electric field is applied, an actuator using the behavior is proposed.

FIGS. 11A and 11B illustrate a bending action of a flexible gel actuator. FIG. 11A illustrates a state where a positive electrode 6a and a negative electrode 6b are disposed on both sides of a gel 5 formed in a flat plate shape so that one end side of the gel 5 extends from the electrode ends. FIG. 11B illustrates a state where voltage is applied between the positive electrode 6a and the negative electrode 6b.

When voltage is applied between the positive electrode 6a and the negative electrode 6b, electric charges are injected from the negative electrode 6b into the gel 5, the electric charges moved to the positive electrode 6a side are accumulated in the positive electrode 6a and a portion near the positive electrode 6a before being discharged, and the action of making the gel 5 electrostatically adhered near the positive electrode 6a is made.

Deformation of the gel 5 is not simple bending but is induced by creep deformation and is deformation that the gel 5 is concentrated at the end portion of the positive electrode 6a. When the electric field is eliminated, the electric charges are discharged, the action that the gel 5 is adhered to the positive electrode 6a is lost, and the gel 5 returns to the original state by its intrinsic elasticity (FIG. 11A). Since the bending deformation occurs accompanying the application of voltage and the cancellation of the application of voltage, an actuator can be formed by using the deformation action.

FIGS. 12A and 12B illustrate an action when a mesh-state electrode is used as a positive electrode 7a and voltage is applied between a negative electrode 7b disposed on the under face of the gel 5 and the positive electrode 7a. FIG. 12B is a state where voltage is applied. When voltage is applied, the gel 5 enters gaps in the mesh of the positive electrode 7a by creep deformation. Since the gel 5 enters the gaps, the gel actuator becomes thinner as a whole. When the application of the voltage is stopped, the gel 5 returns to the original state. By performing the application of the voltage between the positive electrode 7a and the negative electrode 7b and cancellation of the application as described above, the action that the gel actuator expands and contracts as a whole in the thickness direction is made. Consequently, the actuator can be constructed by using the expansion/contraction action.

PRIOR ART DOCUMENT

Patent Document

[Patent Document] Japan Patent Publication JP 2009-273204 A1

Non-Patent Document

[Non-Patent Document 1] Journal of the Robotics Society of Japan, Vol. 27, No. 7, pp. 718~724, 2009

SUMMARY

The actuator having the mesh-shaped positive electrode has advantages such that a required displacement amount (stroke) can be obtained by employing a structure that an electrode and a gel are alternately stacked, a relatively large pressure force (action force) can be obtained, and periodical driving of a few Hz to tens of Hz can be performed.

However, the mesh-shaped positive electrode is provided also to assure the space in which the gel enters so that space has to be assured by using a line having a certain thickness. Consequently, there are a problem that the device becomes heavy and a problem that rigidity becomes higher and flexibility is disturbed.

The present invention is achieved to solve the problems and an object of the invention is to provide a gel which can contract in the thickness direction without using a mesh-shaped electrode as a positive electrode and a gel actuator using the gel.

A gel actuator according to the present invention includes: a gel having a projected part made of an inductive high-polymer material; a positive electrode disposed so as to be in contact with a top of the projected part; and a negative electrode disposed in a position sandwiching the projected part in a height direction in cooperation with the positive electrode. By applying voltage between the positive electrode and the negative electrode, creep deformation occurs in the projected part made of the inductive high-polymer material so that the material is adhered to the negative electrode side, and the interval between the positive and negative electrodes is reduced. When the application of voltage between the positive and negative electrodes is cancelled, the projected parts return to the original state by the elasticity of the inductive high-polymer material itself.

The gel actuator can be constructed as a gel actuator of a layer-stack type formed by stacking a plurality of the gel actuators in a layout of electrically insulating the positive electrode and the negative electrode between layers.

The gel actuator can be constructed in such a manner that the gel has the projected part formed on one of faces of a sheet part made of an inductive high-polymer material, and the negative electrode is disposed on a face opposite to the face provided with the projected part of the sheet part.

The gel actuator can be easily assembled as a layer-stack-type gel actuator, in which the gel is formed as a gel with a negative electrode in which the projected part is formed on one of faces of a sheet part made of an inductive high-polymer material and the negative electrode is embedded in the sheet part, or the gel is formed as a gel with a negative electrode in which the projected part is formed on both faces of a sheet part made of an inductive high-polymer material and the negative electrode is embedded in the sheet part.

The projected part may be provided directly on the negative electrode or the positive electrode, and the other electrode to be paired is disposed while sandwiching the projected part.

As a gel used for the gel actuator, a gel with a negative electrode having a configuration that the projected part is formed on one of faces of a sheet part made of an inductive high-polymer material, and the negative electrode is embedded in the sheet part, or a configuration that the projected part is formed on both faces of a sheet part made of an inductive high-polymer material, and the negative electrode is embedded in the sheet part is effectively used.

The gel actuator and the gel of the present invention perform the action of contraction (expansion/contraction) in the thickness direction by application of voltage between the positive and negative electrodes and cancellation of the application by using the creep deformation of the gel without using the mesh-shaped electrode, and an actuator can be constructed by using the action. Since the contraction action is

EXPLANATIONS OF LETTERS OR NUMERALS

Figure 1A:
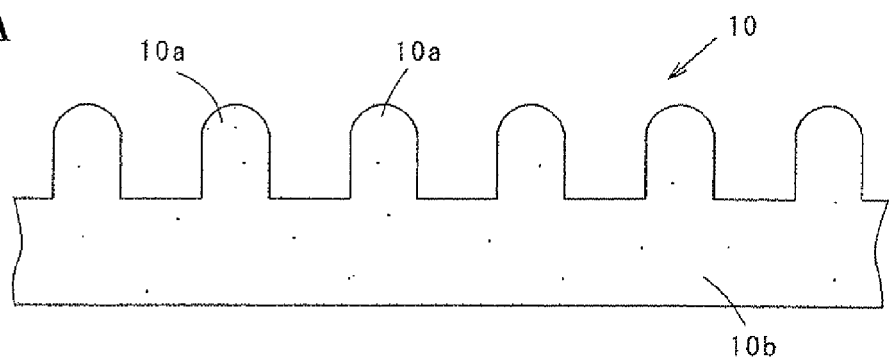
FIGS. 1A to 1C are cross sections illustrating the configuration of a gel used for a gel actuator.

10,11,12: gel
10a: projected part
10b: sheet part
15: forming die
15b: flat-face recessed part
15c: recessed part for forming a projected part
15d: air hole
20: negative electrode
30: positive electrode
40,40a,40b,40c,40d: gel actuator
50,60: layer-stack-type gel actuator

DETAILED DESCRIPTION

Configuration Example of Gel

A gel actuator according to the present invention is constructed by sandwiching a gel in a thickness direction by a positive electrode and a negative electrode and using an action that the gel contracts in the thickness direction when voltage is applied between the positive electrode and the negative electrode. The gel for use in the gel actuator of the present invention is formed in a flat plate shape having a number of projected parts formed in its surface. The positive electrode is disposed so as to be in contact with the top of the projected part formed in the surface of the gel, and the negative electrode is disposed on a face on the side opposite to the surface provided with the projected parts.

Figure 1B:
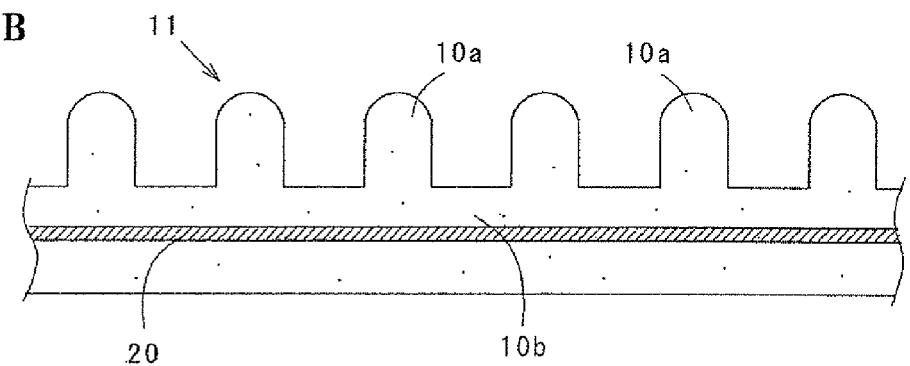
Figure 1C:
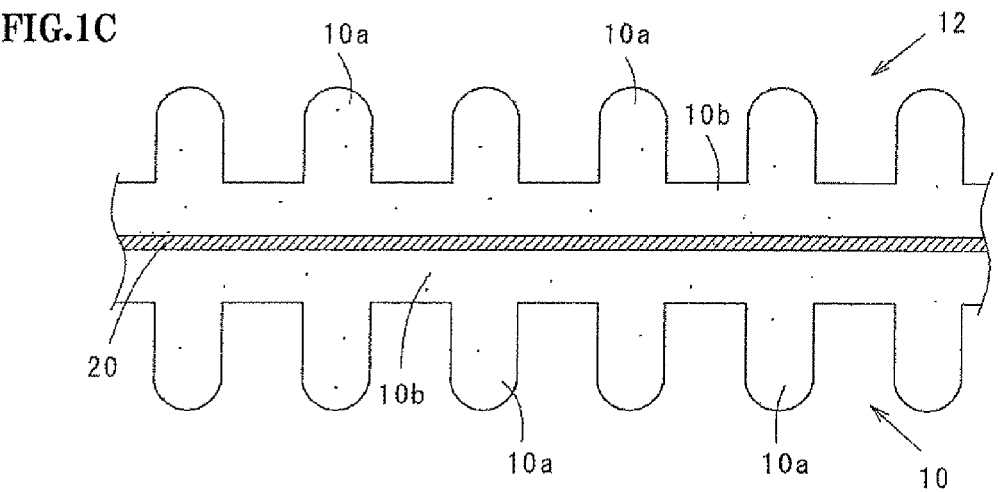

FIGS. 1A to 1C illustrate an example of a gel 10 for use in a gel actuator according to the present invention.

In the gel 10 illustrated in FIG. 1A, a number of projected parts 10a are formed on one of faces of a sheet part 10b as a base part of the gel. The projected parts 10a are formed so as to have the same height at equal intervals on the sheet part 10b. The projected part 10a in the gel 10 illustrated in the diagram is formed in a cylindrical object whose top part has a hemisphere shape. The shape of the projected part 10a may be set to an arbitrary shape such as a cone, a frustum, a pyramid, a truncated pyramid, a spherical shape, or a hemispherical shape. The height, width (diameter), and disposition intervals (disposition density) of the projected parts 10a are not also limited. The thickness, size, and the like of the sheet part 10b can be also properly set, and the plane shape of the sheet part 10b can be also set as an arbitrary shape such as a circular shape, an annular shape, a quadrangle shape, or a hexagonal shape.

FIG. 1B illustrates an example of a so-called gel with a negative electrode, in which a negative electrode 20 is embedded in advance in the sheet part 10b supporting the projected parts 10a. In the case of constructing a gel actuator using the gel 11 with the negative electrode, it is sufficient to dispose the positive electrode so as to be in contact with the top of the projected parts 10a on the side where the projected parts 10a are provided in the gel 11 and apply voltage between the positive electrode and the negative electrode.

To construct a gel actuator by using the gel 10 illustrated in FIG. 1A, the positive electrode is disposed so as to be in contact with the top of the projected parts 10a, and the negative electrode is made in contact with the face on the side opposite to the side of the sheet part 10b where the projected parts 10a are provided. When the gel 11 with the negative electrode illustrated in FIG. 1B is used, a layer-stack-type gel actuator can be formed more easily as compared with the gel 10 illustrated in FIG 1A.

The negative electrode 20 is provided in an entire plane region in which the projected parts 10a are provided by using a conductive material such as metal foil. Since the negative electrode 20 makes an electric field acted on the projected parts 10a, the material and thickness are not particularly limited. In place of metal foil, a conductive layer may be provided by a method such as vapor deposition to form the negative electrode 20. Although the negative electrode 20 is usually provided on an entire face of the sheet part 10b, the invention does not exclude a change such that a small hole is formed in the negative electrode 20 to control the electric field acted on the projected parts 10a.

FIG. 1C illustrates another example of the gel with the negative electrode, which is a gel 12 provided with the projected parts 10a on both faces of the sheet part 10b. With a shape in which the negative electrode 20 is embedded in the sheet part 10b and the projected parts 10a are formed on both faces of the sheet part 10b, at the time of making the electric field acted on the projected parts 10a on both faces, the negative electrode 20 can be used as a common negative electrode 20.

Also by the gel 12 with the negative electrode illustrated in FIG. 1C, it is easy to form a gel actuator in a layer stack type, and there is an advantage that an electrode for making the electric field acted on the gel 12 can be commonly used between the layers.

Method of Manufacturing Gel

As a gel for use in a gel actuator, an inductive high-polymer material in which a bending deformation and/or creep deformation occurs when an electric field is acted can be used. As such an inductive high-polymer material, polyvinyl chloride (PVC), polymethylmethacrylate, polyurethane, polystyrene, polyvinyl acetate, nylon 6, polyvinyl alcohol, polycarbonate, polyethylene terephthalate, polyacrylonitrile, or the like is used.

In the embodiment, polyvinyl chloride (PVC) is used as the material of a gel used for a gel actuator. Polyvinyl chloride has advantages such that a deformation amount by the action of an electric field is large, durability is high, and it is easy to handle.

In practice, dibutyl adipate (DBA) is added as a plasticizer to PVC, and the resultant is completely dissolved in tetrahydrofuran (THF) as a solvent to form a gel solution. The gel solution is casted on a petri dish. The petri dish is disposed horizontally. The gel solution is covered with a forming die and left for a few days to make THF completely evaporated and dried. After that, the gel is detached from the forming die, thereby obtaining a gel provided with projected parts.

Figure 2:
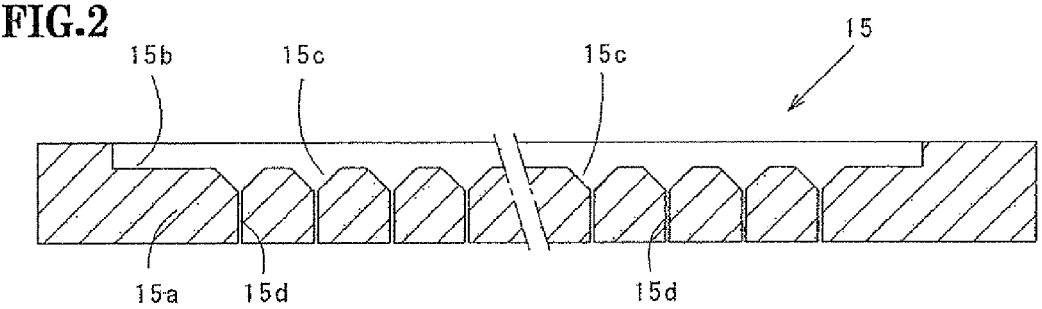
FIG. 2 is a cross section of a forming die used for manufacture of the gel.

FIG. 2 illustrates a forming die 15 used for forming the gel used in an experiment. The forming die 15 has a flat-face recessed part 15b for forming the sheet part 10b in one of faces of a base material 15a having a flat plate shape, and has recessed parts 15c for forming projected parts in an under face of the flat-face recessed part 15b. When the forming die 15 is put on the gel solution casted on the petri dish (the forming die 15 in FIG. 2 faces downward), the gel solution enters the flat-face recessed part 15b and the recessed parts 15c for forming the projected parts. In this state, the gel solution is turned into a gel. In such a manner, a gel having the projected parts 10a is formed.

The forming die 15 has air holes 15d communicating the top part of the recessed part 15c for forming a projection (a part corresponding to the top of a projected part) and the outside. The air holes 15d are provided so that, when the forming die 15 is put on the gel solution, air escapes from the recessed parts 15c for forming projected parts, the top part of the recessed part 15c for forming a projected part is reliably filled with the gel solution, and the projected parts 10a are formed in the predetermined shape.

With the forming die 15 illustrated in FIG. 2, the recessed part 15c for forming a projected part is formed in a cone shape, the depth (height of the projected part) of the recessed part 15c for forming a projected part is 0.8 mm, diameter is 2 mm, and a pitch (interval between top parts of the projected parts) is 3 mm. The diameter of the air hole 15d is 0.3 mm. The depth of the flat-face recessed part 15b (thickness of the sheet part 10b) is 1 mm.

As the forming die used to form a gel, a forming die of a proper shape can be used in accordance with the size and shape of a projected part formed in the gel. For example, by using a mesh-shaped die in place of forming a recessed part for forming a projected part, projected parts may be formed in the gel. By applying the gel solution by a printing method such as screen printing, projected parts can be formed.

For an experiment of the characteristic of a gel actuator which will be described later, the gel 11 with the negative electrode illustrated in FIG. 1B was used.

The gel 11 with the negative electrode was formed as follows. 10 g of a PVC gel solution was casted on a petri dish and left for a few days so as to be dried (to form a sheet part on the lower side of the negative electrode). Subsequently, stainless steel foil (having a thickness of 0.01 mm) as the negative electrode was put on the dried gel, and 4 g of the gel solution was casted on the stainless steel foil to fix the stainless steel foil. Subsequently, 20 g of the gel solution was casted on the gel thinly remained on the surface of the stainless steel foil, the forming die 15 illustrated in FIG. 2 was put on the gel solution, and the gel solution was dried. The gel was taken from the forming die 15 to form the gel 11 in which the negative electrode 20 is embedded.

(Action of Gel)

Figure 3A:
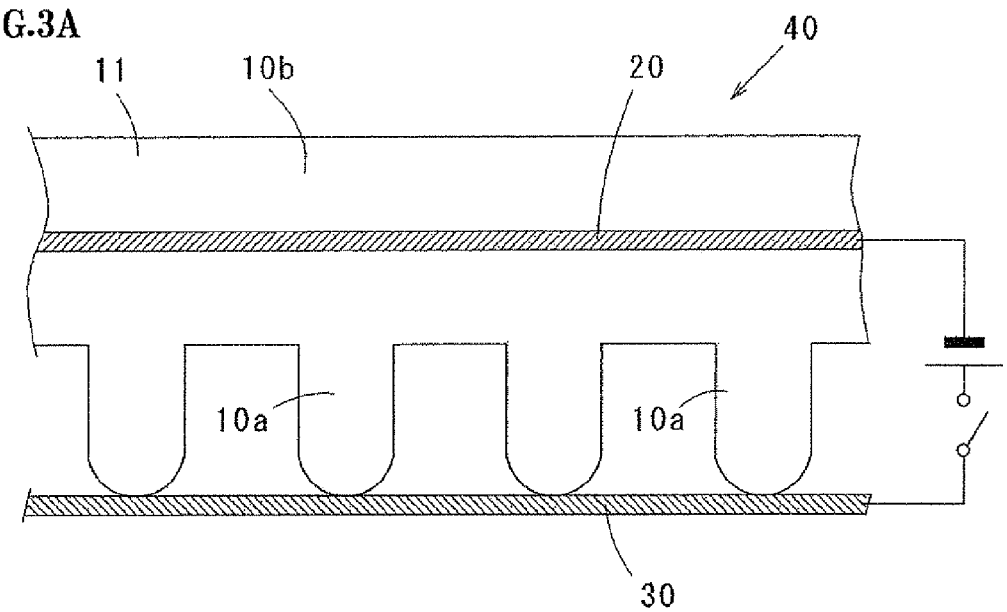
FIGS. 3A and 3B are explanatory diagrams illustrating the configuration and action of the gel actuator.
Figure 3B:
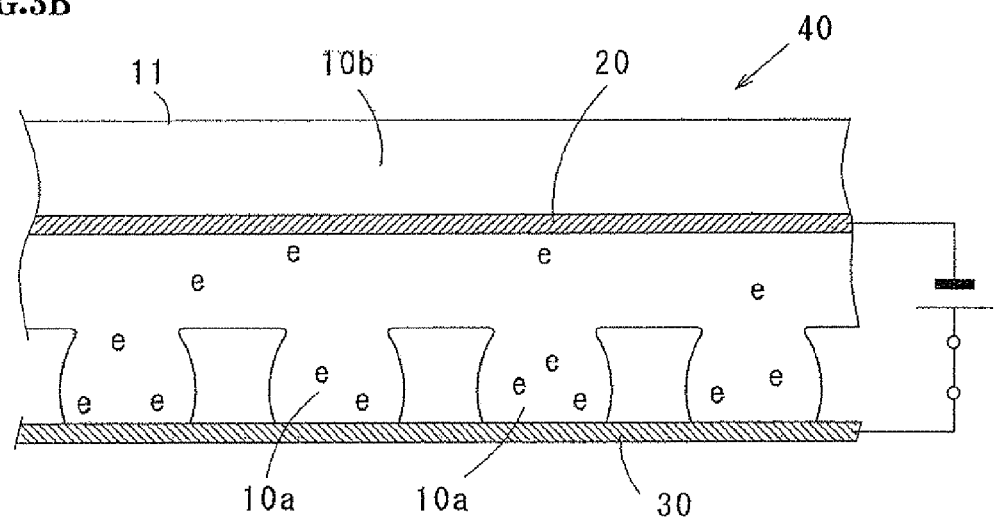

FIGS. 3A and 3B illustrate a gel actuator 40 constructed by disposing a positive electrode 30 for the gel 11 with the negative electrode illustrated in FIG. 1B and the action when voltage is applied to the gel actuator 40.

To contract the gel 11 in the thickness direction, the positive electrode is made in contact with the top of the projected part 10a, and voltage is applied between the positive electrode and the negative electrode. FIG. 3A illustrates a state where the positive electrode 30 is disposed on the face provided with the projected parts 10a of the gel 11, and the positive electrode 30 is made in contact with the projected parts 10a. In reality, the stainless steel foil as the positive electrode 30 was disposed on a glass plate, and the gel 11 was put on the stainless steel foil while the projected parts 10a were turned downward to make the stainless steel foil (positive electrode 30) come into contact with the top of each of the projected parts 10a.

FIG. 3A illustrates a state where no voltage is applied between the positive electrode 30 and the negative electrode 20, and FIG. 3B illustrates a state where voltage is applied between the positive electrode 30 and the negative electrode 20. When voltage is applied between the positive electrode 30 and the negative electrode 20, electric charges are injected from the negative electrode 20 into the gel 11 and the electric charges passing through the projected parts 10a are accumulated near the positive electrode 30. When the electric charges are accumulated near the positive electrode 30, the gel is electrostatically attracted to the positive electrode 30 side, and creep deformation occurs in the projected parts 10a so that the projected parts 10a are adhered to the positive electrode 30. That is, when voltage is applied, the height of the projected parts 10a decreases, and the thickness of the gel actuator 40 decreases as a whole (contraction occurs). When the application of voltage is cancelled, the electric charges disappear by the discharge, the action that the projected parts 10a are adhered to the positive electrode 30 is lost, and the gel actuator 40 returns to the original state by the elasticity of the gel itself.

In such a manner, by repeating the operation of applying the voltage between the positive electrode 30 and the negative electrode 20 of the gel actuator 40 and cancelling the application of the voltage, the gel actuator 40 alternately enters a state where it contracts in the thickness direction and a state where it returns to the original thickness.

FIGS. 3A and 3B illustrate the action (operation) when voltage is applied between the positive electrode 30 and the negative electrode 20 in the gel actuator 40 using the gel 11 with the negative electrode illustrated in FIG. 1B. Also with respect to the gels 10 and 12 illustrated in FIGS. 1A and 1B, by making the voltage acted between the positive electrode 30 and the negative electrode 20, a gel actuator which similarly operates can be constructed.

In the gel actuator constructed by using the gel having the projected parts 10a, when voltage is applied between the positive electrode 30 and the negative electrode 20, creep deformation occurs in the projected parts 10a and the projected parts 10a contract by using the action that the projected parts 10a are adhered to the negative electrode 20 side. Consequently, a gel in any form can be used as long as it can perform the action. For example, as the form of the gel with the negative electrode, the present invention is not limited to the form that the negative electrode 20 is embedded in the sheet part 10b but may employ a form that the negative electrode 20 is provided on one of faces of the sheet part 10b so as to be exposed and the projected parts 10a made of gel are provided directly on the negative electrode 20. The invention may also employ a configuration that the projected parts 10a made of gel are provided directly on the negative electrode 20 or the positive electrode 30 without providing the sheet part 10b and the electrodes are a pair which are disposed while sandwiching the projected parts 10a.

Driving Characteristic of Gel Actuator

Hereinafter, a result of examining the drive characteristic of the gel actuator 40 (single-layer structure) using the gel 11 with the negative electrode illustrated in FIGS. 3A and 3B will be described.

Displacement Characteristic

Figure 4:
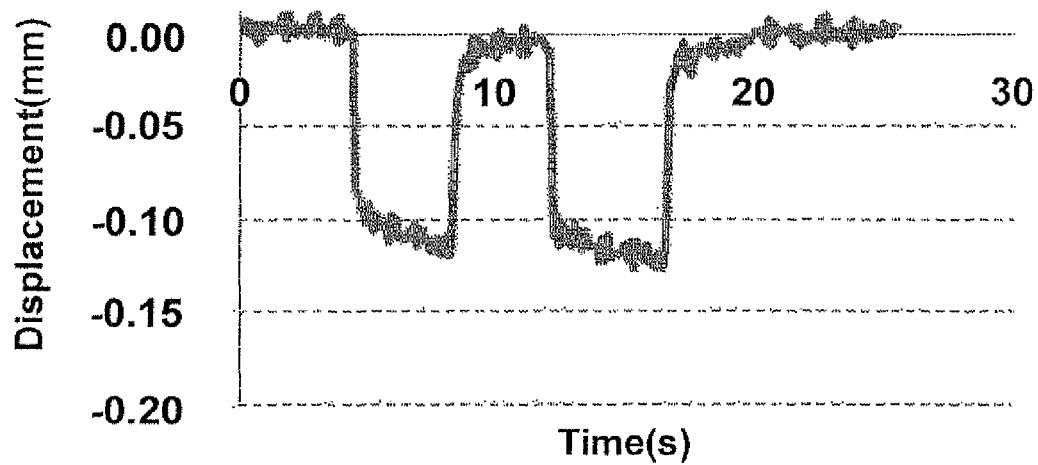
FIG. 4 is a graph illustrating a measurement result of a displacement characteristic of the gel actuator.

FIG. 4 illustrates a result of measuring how a displacement amount in the thickness direction changes when voltage is applied to the gel actuator. The measurement result relates to the case where the application voltage was 1200V. The displacement amount of the gel actuator was measured by using a laser displacement measuring device. It is understood that the gel actuator contracts when the voltage is applied and returns to the original thickness when the voltage application is cancelled.

Figure 5:
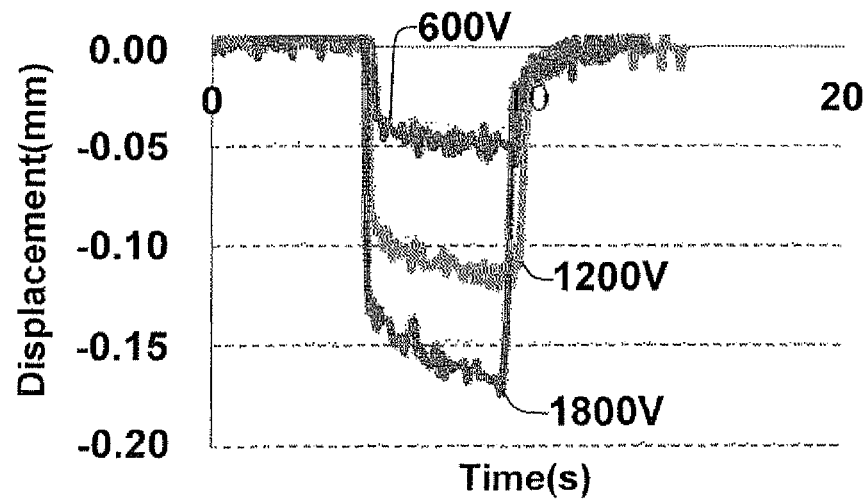
FIG. 5 is a graph illustrating a measurement result of the displacement characteristic while changing application voltage.

FIG. 5 illustrates displacement amounts when application voltage was set to 600V, 1200V, and 1800V for the same sample as that used in the experiment of FIG. 4.

The measurement result indicates that the displacement amount increases as the application voltage increases. The displacement amount of the gel actuator when the application voltage is set to 1800V is 0.17 mm at the maximum, The displacement amount corresponds to about 14% of the thickness of the entire gel actuator.

Generation Force

A pushing force (generation force) which is generated when the gel actuator returns from the contraction state to the original state was measured. The measurement was made by a method of eliminating voltage from a state where the gel actuator contracts due to application of voltage to make the gel actuator expand and measuring the pushing force at the time of expansion by a force sensor.

A sample of the gel actuator has a circular disc shape having a size of 50 mm, thickness of a gel (including the projected parts) is 1.15 mm, and stainless steel foil having a thickness of 0.01 mm was used as the positive electrode.

Figure 6:
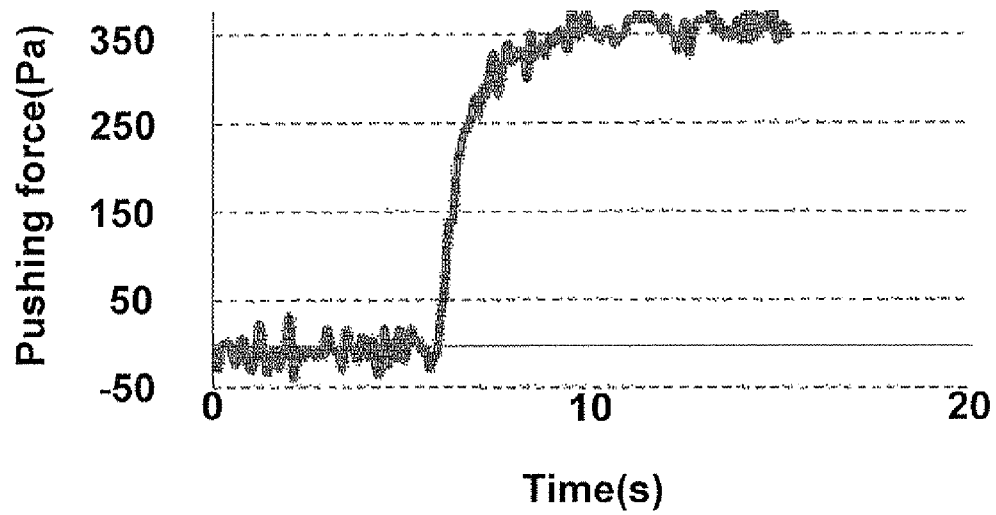
FIG. 6 is a graph illustrating a measurement result of generation force of the gel actuator.

FIG. 6 illustrates a result of measuring a pushing force (generation force) when the application voltage was 1200V. As the pushing force, about 350 Pa was obtained.

Figure 7:
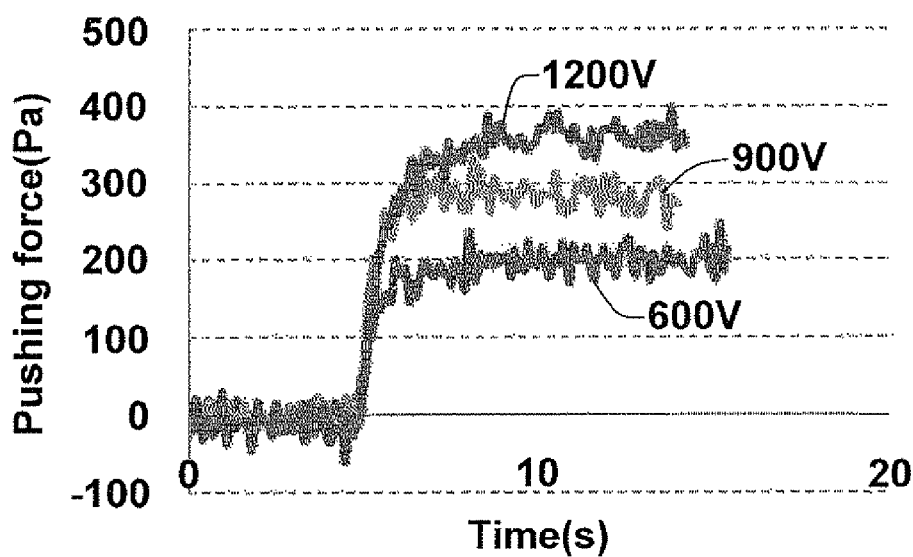
FIG. 7 is graph illustrating a measurement result of generation force of the gel actuator while changing application voltage.

FIG. 7 illustrates a result of examining how the pushing force changes by the application voltage. FIG. 7 illustrates that as the application voltage increases, the pushing force increases.

Response Characteristic

Figure 8:
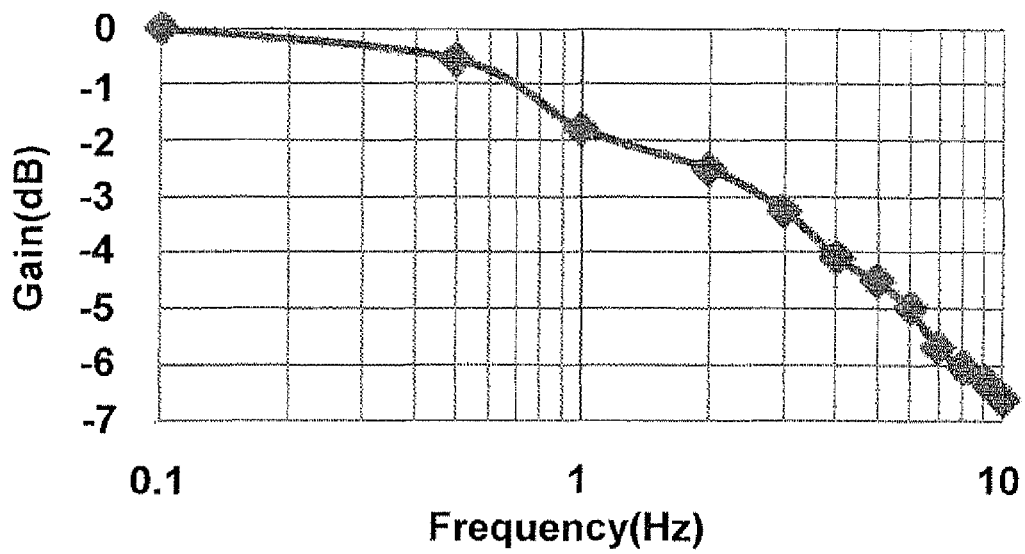
FIG. 8 is a graph illustrating a result of measurement of a response characteristic of the gel actuator.

A sine wave of voltage 900V was applied to the gel actuator using the gel with the negative electrode illustrated in FIG. 3 and a response characteristic of the gel actuator was measured. While changing the frequency of the sine wave voltage applied from 0.1 Hz to 10 Hz, the amplitude of the displacement at that time was measured. FIG. 8 is a gain chart of the displacement. The bandwidth is 2 Hz until the gain becomes −3 dB. The measurement result indicates that the above-described gel actuator sufficiently follows when the frequency of the application voltage is about 2 Hz.

Another Configuration Example of Gel Actuator

The gel actuator used in the above-described experiment is of the single-layer structure formed by a single gel. The gel actuator can be used as a single-layer structure or a stacked-layer structure in which gel actuators each as a unit are stacked in the thickness direction.

Figure 9A:
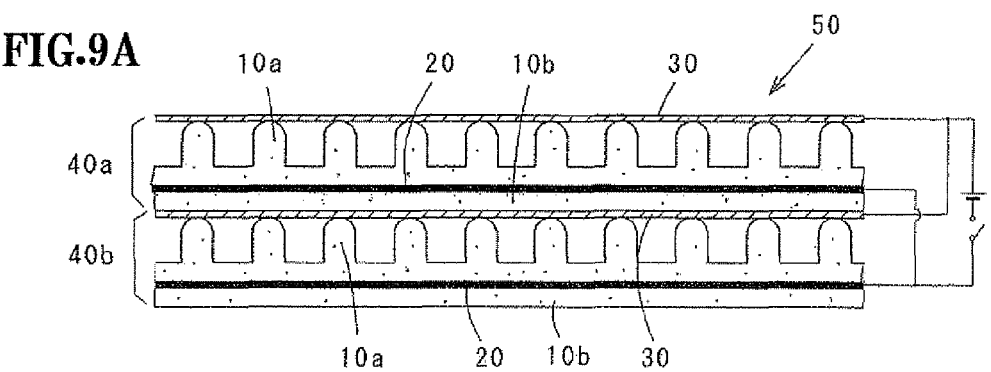
FIGS. 9A and 9B are explanatory diagrams illustrating the configuration and action of a gel actuator of a layer stack type.
Figure 9B:
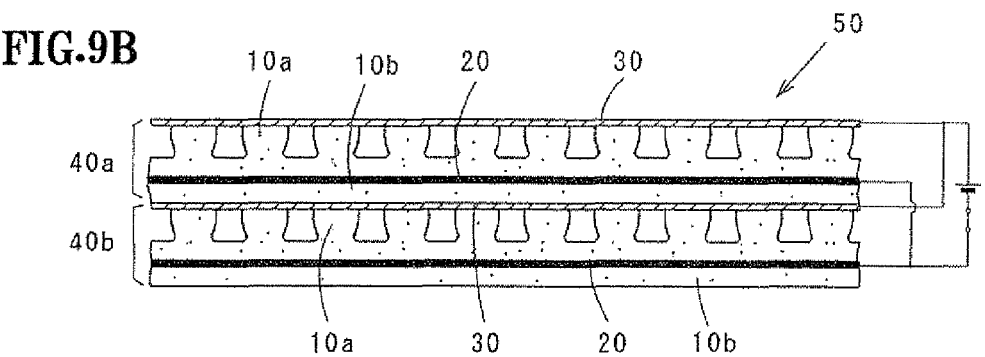

FIGS. 9A and 9B illustrate an example of constructing a gel actuator 50 of a layer stack type using the gel 11 (FIG. 1B) with the negative electrode and having the projected parts 10a on one face. The gel actuator 50 is formed by setting the projected parts 10a of gels to be stacked in the same direction and stacking the gels 11 each with the negative electrode while the positive electrode 30 is interposed so that the positive electrode 30 comes into contact with the top of each of the projected parts 10a.

The positive electrodes 30 of gel actuators 40a and 40b as units constructing the gel actuator 50 are connected to the positive electrode of a power supply, the negative electrodes 20 are connected to the negative electrode of the power supply, and voltage is applied.

FIG. 9B illustrates a state where the voltage is applied. When voltage is applied to the gel actuator 50, each of the gel actuators 40a and 40b contracts in the thickness direction, and the gel actuator 50 as a whole contracts in the thickness direction. Since the contraction amounts of the gel actuators 40a and 40b are cumulated, the contraction amount (deformation amount) of the gel actuator 50 of a layer stack type can be made larger than that in the case of using a single gel actuator.

Figure 10A:
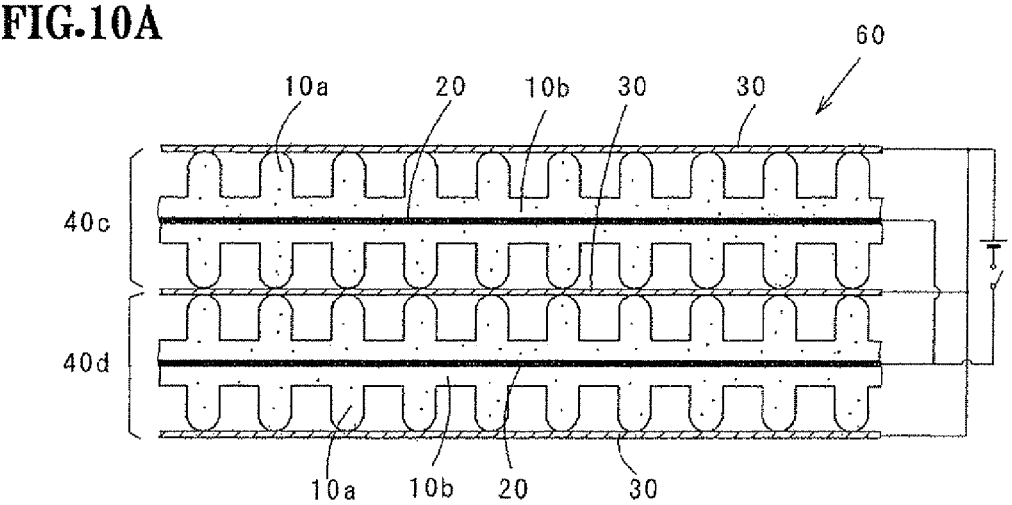
FIGS. 10A and 10B are explanatory diagrams illustrating the configuration and action of the gel actuator of the layer stack type.
Figure 10B:
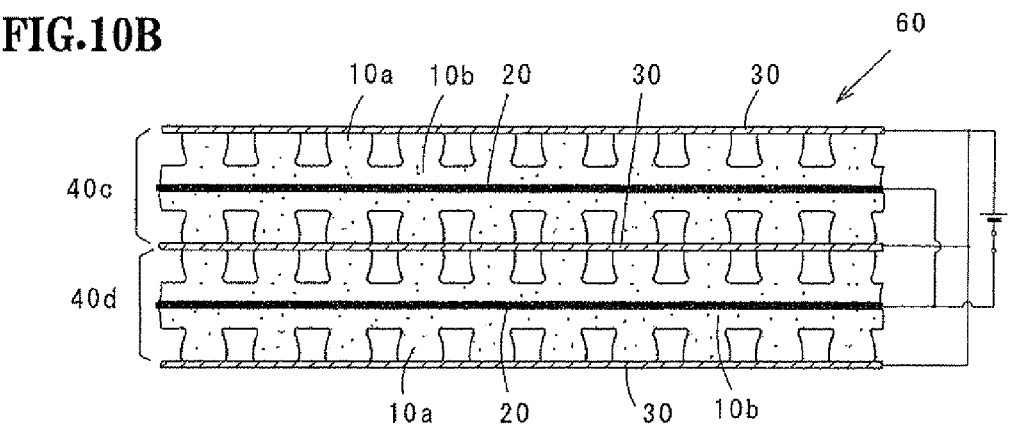
Figure 11A:
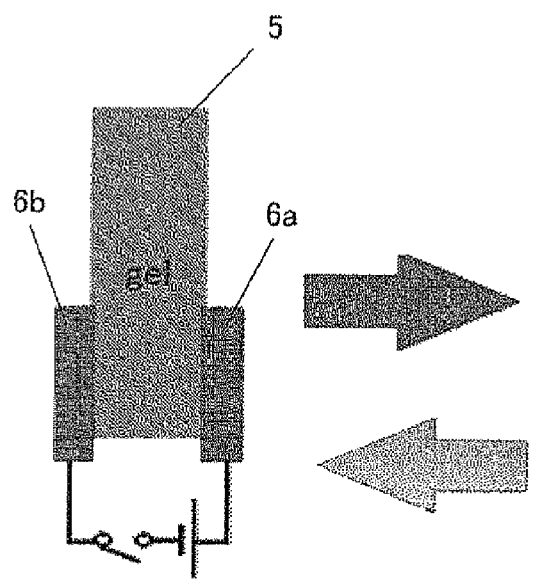
FIGS. 11A and 11B are explanatory diagrams illustrating a bending action of a flexible gel actuator.
Figure 11B:
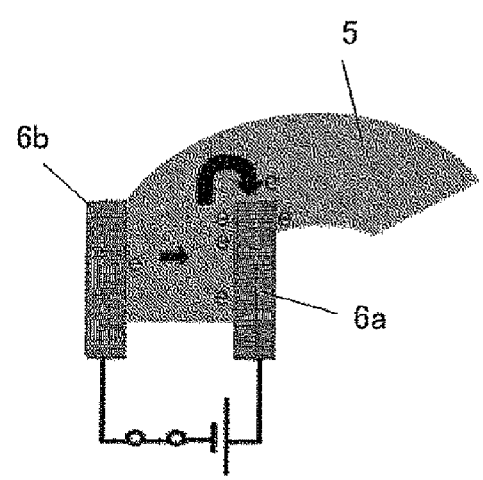
Figure 12A:
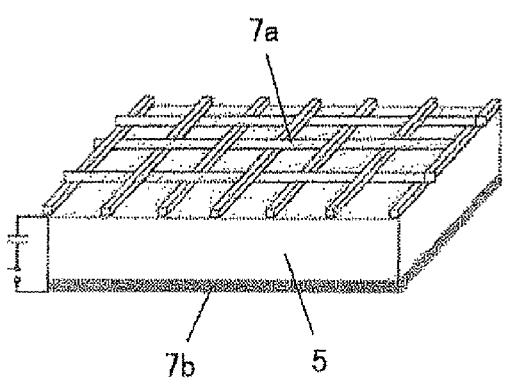
FIGS. 12A and 12B are explanatory diagrams illustrating the action of a gel actuator using a mesh-shaped electrode.
Figure 12B:
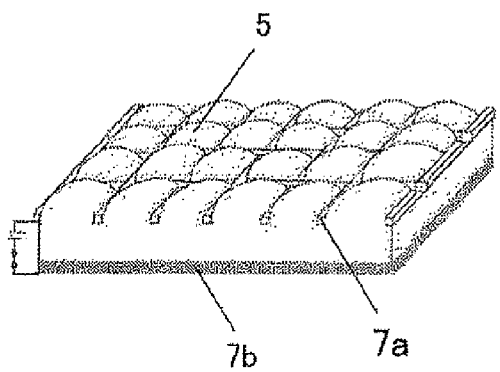

FIGS. 10A and 10B illustrate an example of a gel actuator 60 formed by using the gel 12 with the negative electrode and having the projected parts 10a on both faces of a gel illustrated in FIG. 1C. Also in the gel actuator 60 of the embodiment, the gels 12 are stacked while the positive electrode 30 is interposed between the projected parts 10a of the gels 12 stacked so that the positive electrode 30 comes into contact with the top of each of the projected parts 10a.

In the gel actuator 60 of the embodiment, when voltage is applied, the negative electrode 20 acts as an electrode common to the projected parts 10a on its both sides and the positive electrode 30 acts as an electrode common to the projected parts 10a on its both sides.

FIG. 10B illustrates a state where voltage is applied to the gel actuator 60. The gel actuators 40c and 40d as units contract in the thickness direction, and the gel actuator 60 as a whole contracts in the thickness direction.

The gel actuator 60 of the embodiment uses the gel with the negative electrode and having the projected parts 10a on both faces of the gel. Consequently, as compared with the case of using the gel with the negative electrode and having the projected parts 10a on its one face, a large displacement amount can be obtained while reducing the size in the thickness direction.

Although the gel actuator 50 illustrated in FIG. 9 is an example of stacking two gels 11 as units and the gel actuator 60 illustrated in FIG. 10 is an example of stacking two gels 12 as units, an arbitrary number can be selected for gels stacked in the gel actuator. By increasing the number of gels as units stacked in the gel actuator, the displacement amount of the entire gel actuator can be increased. By setting a gel actuator of a layer-stack structure, the generation force (pushing force) accompanying the displacement of the gel actuator can be also increased.

In the gel actuator 50 illustrated in FIGS. 9A and 9B, the sheet part 10b also has an action of electrically insulating the positive electrode 30 and the negative electrode 20 at the time of stacking the gels 11 between the layers. At the time of forming the layer-stack-type gel actuator by stacking gels having the projected parts 10a, electric insulation has to be provided between the layers so that the positive electrode 30 and the negative electrode 20 are not electrically short-circuited. A gel may be used as an insulating layer like the gel 11 or a configuration of stacking gels while providing a specific insulating layer may be employed.

The gel actuator according to the present invention has the layout that a gel having the projected parts is sandwiched between a positive electrode and a negative electrode in the thickness direction and uses an action that the projected parts are deformed when voltage is applied between the positive electrode and the negative electrode. Consequently, a thin conductive material such as metal foil can be used as each of the positive and negative electrodes. Thus, the electrode can be made thinner as compared with the case of using a mesh electrode. Also in the case of stacking a number of gel actuators, the size (thickness) and weight can be reduced. Since a gel is very flexible and an electrode is also thinly formed and flexible, they can be used effectively as components for driving which are requested to have flexibility.

What is claimed is:

1. A gel actuator comprising:
    a gel having a projected part made of an inductive high-polymer material;
    a positive electrode disposed so as to be in contact with a top of the projected part; and
    a negative electrode disposed in a position sandwiching the projected part in a height direction in cooperation with the positive electrode.

2. A gel actuator of a layer-stack type formed by stacking a plurality of gel actuators according to claim 1 as a layout of electrically insulating the positive electrode and the negative electrode between the layers.

3. The gel actuator according to claim 1, wherein
    the gel has the projected part formed on one of faces of a sheet part made of an inductive high-polymer material, and
    the negative electrode is disposed on a face opposite to the face provided with the projected part of the sheet part.

4. The gel actuator according to claim 1, wherein the gel is formed as a gel with a negative electrode in which the projected part is formed on one of faces of a sheet part made of an inductive high-polymer material and the negative electrode is embedded in the sheet part.

5. The gel actuator according to claim 1, wherein the gel is formed as a gel with a negative electrode in which the projected part is formed on both faces of a sheet part made of an inductive high-polymer material and the negative electrode is embedded in the sheet part.

6. The gel actuator according to claim 1, wherein the projected part is provided directly on the negative electrode or the positive electrode, and the other electrode to be paired is disposed while sandwiching the projected part.

7. A gel with a negative electrode for use in the gel actuator according to claim 1, wherein
    the projected part is formed on one of faces of a sheet part made of an inductive high-polymer material, and
    the negative electrode is embedded in the sheet part.

8. A gel with a negative electrode for use in the gel actuator according to claim 1, wherein
    the projected part is formed on both faces of a sheet part made of an inductive high-polymer material, and
    the negative electrode is embedded in the sheet part.

9. The gel actuator according to claim 2, wherein
    the gel has the projected part formed on one of faces of a sheet part made of an inductive high-polymer material, and
    the negative electrode is disposed on a face opposite to the face provided with the projected part of the sheet part.

10. The gel actuator according to claim 2, wherein the gel is formed as a gel with a negative electrode in which the projected part is formed on one of faces of a sheet part made of an inductive high-polymer material and the negative electrode is embedded in the sheet part.

11. The gel actuator according to claim 2, wherein the gel is formed as a gel with a negative electrode in which the projected part is formed on both faces of a sheet part made of an inductive high-polymer material and the negative electrode is embedded in the sheet part.

12. The gel actuator according to claim 2, wherein the projected part is provided directly on the negative electrode or the positive electrode, and the other electrode to be paired is disposed while sandwiching the projected part.

13. A gel with a negative electrode for use in the gel actuator according to claim 2, wherein
    the projected part is formed on one of faces of a sheet part made of an inductive high-polymer material, and
    the negative electrode is embedded in the sheet part.

14. A gel with a negative electrode for use in the gel actuator according to claim 2, wherein
    the projected part is formed on both faces of a sheet part made of an inductive high-polymer material, and
    the negative electrode is embedded in the sheet part.

* * * * *